No. 781,960. PATENTED FEB. 7, 1905.
F. G. MARBACH.
COMBINED TEMPLET AND GAGE.
APPLICATION FILED FEB. 8, 1904.
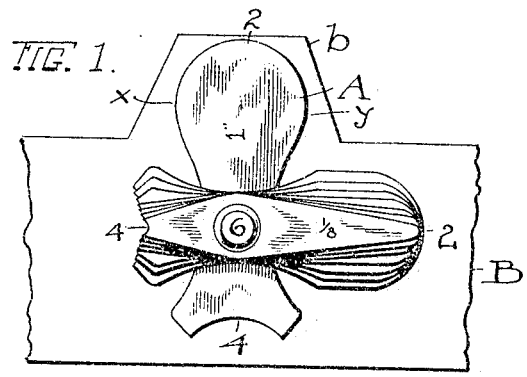
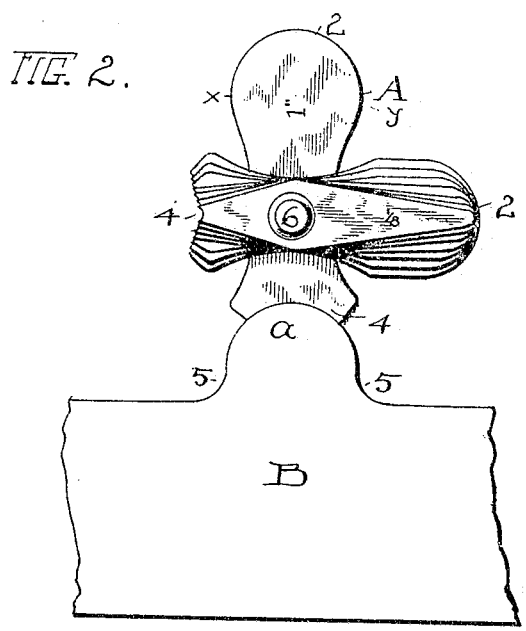
WITNESSES:
INVENTOR.
Frank G. Marbach
BY H. F. Fisher
ATTORNEY.

No. 781,960.                                       Patented February 7, 1905.

UNITED STATES PATENT OFFICE.

FRANK G. MARBACH, OF MEDINA, OHIO.

COMBINED TEMPLET AND GAGE.

SPECIFICATION forming part of Letters Patent No. 781,960, dated February 7, 1905.

Application filed February 8, 1904. Serial No. 192,495.

*To all whom it may concern:*

Be it known that I, FRANK G. MARBACH, a citizen of the United States, residing at Medina, in the county of Medina and State of Ohio, have invented certain new and useful Improvements in a Combined Templet and Gage; and I do declare that the following is a full, clear, and exact description of the invention, which will enable others skilled in the art to which it appertains to make and use the same.

My invention relates to a combined templet and gage; and the object of the invention is to provide a device for machinists' use more especially, which combines the characteristics or functions of both a complete templet and a complete gage in the same member, so that in some instances the same end of a member can be used for both laying out the work and for gaging or proving it, or, as in other instances, one end of each member may be used as the pattern and the other end to prove or gage the work. The latter use is illustrated in the annexed drawings. Hitherto in order to get similar results to these it has been the practice of machinists to scribe the shape and size required upon a suitable plate or plates, whether it was of concave or convex form, and then file the plate down to the scribed line or mark, and thus make a pattern; but obviously this was a slow process at the best and of doubtful accuracy in the end, because of the difficulty both in getting an accurate pattern and of getting accurate work from a pattern produced in this way. Then, again, when it came to gaging the work for its accuracy there was no standard or perfectly-designed gage available to verify the correctness of the work done and uniformity was next to impossible; but with my device all these difficulties and objections have been overcome and both a perfect pattern and a perfect gage for the work is provided, and the high quality of the tool cannot be questioned, because it is proved for its correctness by perfect mechanical tests.

In the accompanying drawings, Figure 1 is a side elevation of the tool with one leaf or fold open and used as a pattern to outline a convex rib or projection of a given size. Fig. 2 is a plain elevation of the tool open as it is shown in Fig. 2, but in this instance used as a gage to prove the work that has been done as laid out in Fig. 1. Fig. 3 is an edge view of the device folded. It is folded also in Figs. 1 and 2, except a single section or leaf.

As thus shown, the device comprises a series of eight leaves or plates A, graduated in size from one-eighth of an inch in the smaller leaf to one inch in the larger leaf. This, however, more accurately expresses the relative and progressive sizes of the convex ends 2 rather than the concave ends 4. These latter ends have exactly the same radius as the convex ends 2; but their compass or reach of curvature is shorter relatively in about the proportions shown in Figs. 1 and 2. Here the first or largest leaf in the series is of a one-inch pattern or size and has a horizon or arc of one hundred and eighty degrees between its terminals $x$ and $y$. This of course is an exact half-circle; but the concavity in the opposite end of this member is only about ninety degrees or a quadrant of a circle. This difference is important, because it enables a surface to be gaged by the concave end 4 which is considerably less than a half-circle in depth. Thus if the rib $a$ were cut, say, to a quarter of a circle it could still be proved or gaged by the end 4, which would not be possible if it had a one-hundred-and-eighty-degree arc, and the same difference occurs in all the other leaves or folds, although it is less noticeable in the smaller ones. In some cases the end 2 becomes both pattern and gage, as where a concavity is made. Thus, referring to Fig. 1, it will be noticed that there is stock in the angle between the body B of the material worked upon and the upright portion $b$. In Fig. 2 this stock has been cut away and a concavity 5 is produced instead. This concavity is of the half-inch pattern or size, and the convex end 2 of the half-inch leaf presumably has been used both as a templet or pattern to describe the line to which the cut should go and as a gage to prove the work when done. The same rule applies to concavities of all sizes within the range of the tool; but in all cases of convex work both ends of the same leaf or fold are used, and this according to the size of work wanted. All the leaves are of the same length in this instance and are provided with a single pivot 6 between their ends, on which they are independently rotatable and foldable, and they run consecutively from the smallest to the largest in graduated series. On some jobs two or more of the series are used.

What I claim is—

A tool for patterning and gaging surfaces, the same comprising a series of leaves graduated in size at each end and pivoted together between their ends, and each leaf having its ends reversely curved and both ends curved on the same radius of curvature but of gradually-increasing length of curvature from the smaller to the greater leaf, substantially as described.

In testimony whereof I sign this specification in the presence of two witnesses.

FRANK G. MARBACH.

Witnesses:
R. B. MOSER,
C. A. SELL.